US012516774B1

(12) United States Patent
Love

(10) Patent No.: US 12,516,774 B1
(45) Date of Patent: Jan. 6, 2026

(54) SYSTEM AND METHOD FOR AN ADJUSTABLE AND UNIVERSAL OVERHEAD BICYCLE HANGER

(71) Applicant: Donnie Ray Love, Fort Worth, TX (US)

(72) Inventor: Donnie Ray Love, Fort Worth, TX (US)

(*) Notice: Subject to any disclaimer, the term of this patent is extended or adjusted under 35 U.S.C. 154(b) by 0 days.

(21) Appl. No.: 18/763,046

(22) Filed: Jul. 3, 2024

(51) Int. Cl.
F16M 13/02 (2006.01)
B62H 3/10 (2006.01)

(52) U.S. Cl.
CPC ............ F16M 13/027 (2013.01); B62H 3/10 (2013.01)

(58) Field of Classification Search
CPC ... B62H 3/02; B62H 3/10; B62H 3/12; B66D 3/04; F16M 13/027
See application file for complete search history.

(56) References Cited

U.S. PATENT DOCUMENTS

| 557,567 | A | * | 4/1896 | Eddy | B62H 3/12 211/17 |
| 595,967 | A | * | 12/1897 | Parsons | B62H 3/12 211/175 |
| 607,024 | A | * | 7/1898 | Durfee et al. | B62H 3/12 211/99 |
| 3,770,133 | A | * | 11/1973 | Kolker | E04H 6/005 410/3 |
| 3,872,972 | A | * | 3/1975 | Cummins | B62H 3/12 211/117 |
| 3,924,751 | A | * | 12/1975 | Ballenger | B62H 3/12 211/117 |
| 4,343,404 | A | * | 8/1982 | Folsom | B25H 1/0007 248/114 |
| 5,183,162 | A | * | 2/1993 | Ritzenthaler | B62H 3/12 211/121 |
| 5,354,035 | A | * | 10/1994 | Helgren | B62H 3/12 224/924 |
| D353,353 | S | * | 12/1994 | Katsaros | D12/115 |
| 5,460,274 | A | * | 10/1995 | Kramer | B62H 3/12 248/339 |

(Continued)

FOREIGN PATENT DOCUMENTS

| DE | 19918074 A1 | * | 10/2000 | ............ B62H 3/12 |
| KR | 20120000620 A | * | 1/2012 | ............ E04H 6/12 |
| KR | 20120096706 A | * | 8/2012 | ............ B62H 3/02 |

Primary Examiner — Patrick D Hawn
(74) Attorney, Agent, or Firm — Eversheds Sutherland (US) LLP

(57) ABSTRACT

Embodiments of a bicycle hanger system and method include a track to be coupled to a ceiling, the track including a sliding mechanism with a hook and an elongated pull coupled to the hook. The system also includes a second track to be coupled to the ceiling, positioned perpendicular to the first track, and including a second sliding mechanism with a second hook and a second elongated pull coupled to the second hook. Additionally, a third hook is coupled to the ceiling, designed to secure a forward wheel of a bicycle. The first hook and the second hook secure a rearward wheel and a bicycle frame using the elongated pull and the second elongated pull, allowing the hooks to be positioned according to the size of the bicycle. The system allows for adjustable positioning of the bicycle to avoid blocking space beneath, accommodating different bicycle sizes and configurations securely against the ceiling.

11 Claims, 5 Drawing Sheets

(56) References Cited

U.S. PATENT DOCUMENTS

| | | | | |
|---|---|---|---|---|
| 5,794,793 A * | 8/1998 | Frederick | ............... | B62H 3/12 |
| | | | | 211/20 |
| 5,848,708 A * | 12/1998 | Edwards | ............... | B62H 3/12 |
| | | | | 211/20 |
| 6,095,344 A * | 8/2000 | White | ............... | B62H 3/12 |
| | | | | 211/21 |
| 6,237,781 B1 * | 5/2001 | Dahl | ............... | B62H 3/12 |
| | | | | 248/320 |
| 6,302,278 B1 * | 10/2001 | Dueck | ............... | A47F 7/00 |
| | | | | 211/104 |
| 7,150,449 B1 * | 12/2006 | Dueck | ............... | B62H 3/12 |
| | | | | 248/329 |
| 7,165,684 B2 * | 1/2007 | Ferron | ............... | B62H 3/12 |
| | | | | 211/118 |
| 7,494,110 B2 * | 2/2009 | Lob | ............... | B66D 1/06 |
| | | | | 254/338 |
| 7,631,854 B1 * | 12/2009 | Mountain | ............... | B62H 3/12 |
| | | | | 254/390 |
| 8,047,492 B2 * | 11/2011 | Wang | ............... | B62H 3/12 |
| | | | | 211/106.01 |
| 8,468,745 B2 * | 6/2013 | Krause | ............... | B62H 3/00 |
| | | | | 248/323 |
| 8,757,397 B2 * | 6/2014 | Shaha | ............... | B62H 3/12 |
| | | | | 211/17 |
| 8,893,899 B1 * | 11/2014 | Hund | ............... | B60R 9/10 |
| | | | | 211/85.7 |
| 9,809,430 B2 * | 11/2017 | Wescott | ............... | A62B 35/0037 |
| 10,718,499 B1 * | 7/2020 | DiFelice | ............... | F16C 11/0695 |
| 11,654,989 B2 * | 5/2023 | Hall | ............... | F16M 13/027 |
| | | | | 248/542 |

\* cited by examiner

SYSTEM AND METHOD FOR AN ADJUSTABLE AND UNIVERSAL OVERHEAD BICYCLE HANGER

TECHNICAL FIELD

This application relates generally to bicycle storage systems. More specifically, this application relates to an adjustable overhead bicycle hanger system designed to secure bicycles of various sizes to a ceiling without blocking the space beneath, using sliding mechanisms, hooks, and elongated pulls for optimal positioning and stability.

BACKGROUND

Overhead bicycle hangers typically require a particular size bicycle and rely on hooks that enable the bicycle to hang from a ceiling. Many overhead bicycle hanger require a bicycle to suspend from the tires and therefore block areas beneath the bicycle. What is needed is a universal bicycle hanger that can be adjusted and not necessitate blocking of space beneath the bicycle.

SUMMARY

In accordance with one or more embodiments, a system for a bicycle hanger includes: a track configured to be coupled to a ceiling, the track including a sliding mechanism, the sliding mechanism including a hook and an elongated pull coupled to the hook; and a second track configured to be coupled to the ceiling the second track positioned perpendicular to the track, the second track including a second sliding mechanism, the second sliding mechanism including a second hook and a second elongated pull coupled to the second hook.

In one or more embodiments, the system includes a bar clamp configured to secure a bicycle tire to a frame component to secure the bicycle prior to hanging the bicycle.

In one or more embodiments, the track and the second track are configured with a "T" track to enable the sliding mechanism and second sliding mechanism to engage the track and the second track.

In one or more embodiments, the system further includes a first pair of "z" brackets and a second pair of "z" brackets, the first pair of "z" brackets configured to couple the track to the ceiling, the second pair of "z" brackets configured to couple the second track to the ceiling.

In one or more embodiments, the elongated pull and the second elongated pull includes one or more of a rope, a chain, an elastic band, a wire or spring.

In one or more embodiments, each hook includes a curved metal coupled to the sliding mechanism via a clevis to enable back and forth movement of the hook.

In one or more embodiments, each hook is coupled to the elongated pull to enable attachment of the hook to a bicycle portion and positioning of a bicycle via pulling the elongated pull.

In one or more embodiments each hook includes an elastomeric, rubber or vinyl coating configured to prevent scratching of the bicycle.

In one or more embodiments the hook and the second hook are configured with different sizing to enable coupling of the bicycle using different component parts of the bicycle for securing the bicycle to the ceiling.

Another embodiment is directed to a method for a bicycle hanger system includes determining a stud pattern for a ceiling; installing a first track along a stud in the ceiling according to the stud pattern, the first track configured to be coupled to the ceiling, the first track including a sliding mechanism, the sliding mechanism including a hook and an elongated pull coupled to the hook; and installing a second track perpendicular to the first track according to the stud pattern, the second track configured to be coupled to the ceiling, the second track including a second sliding mechanism, the second sliding mechanism including a second hook and a second elongated pull coupled to a second hook.

The method for a bicycle hanger system further includes clamping one or more tires of the bicycle to a bicycle frame component to secure the bicycle prior to hanging the bicycle.

In one or more embodiments, the method for bicycle hanger system further includes installing a first pair of "z" brackets and a second pair of "z" brackets, the first pair of "z" brackets configured to couple the track to the ceiling, the second pair of "z" brackets configured to couple the second track to the ceiling.

In one or more embodiments, the method for bicycle hanger system further includes attaching the bicycle to the hook and the second hook, wherein the hook is attached to a frame of the bicycle, and second hook is attached to a wheel component of the bicycle.

In one or more embodiments the method includes pulling a first elongated handle to secure the bicycle frame against the ceiling.

In another embodiment, the method includes pulling the second elongated handle to secure the bicycle flush against the ceiling.

DETAILED DESCRIPTION

Figure 1:
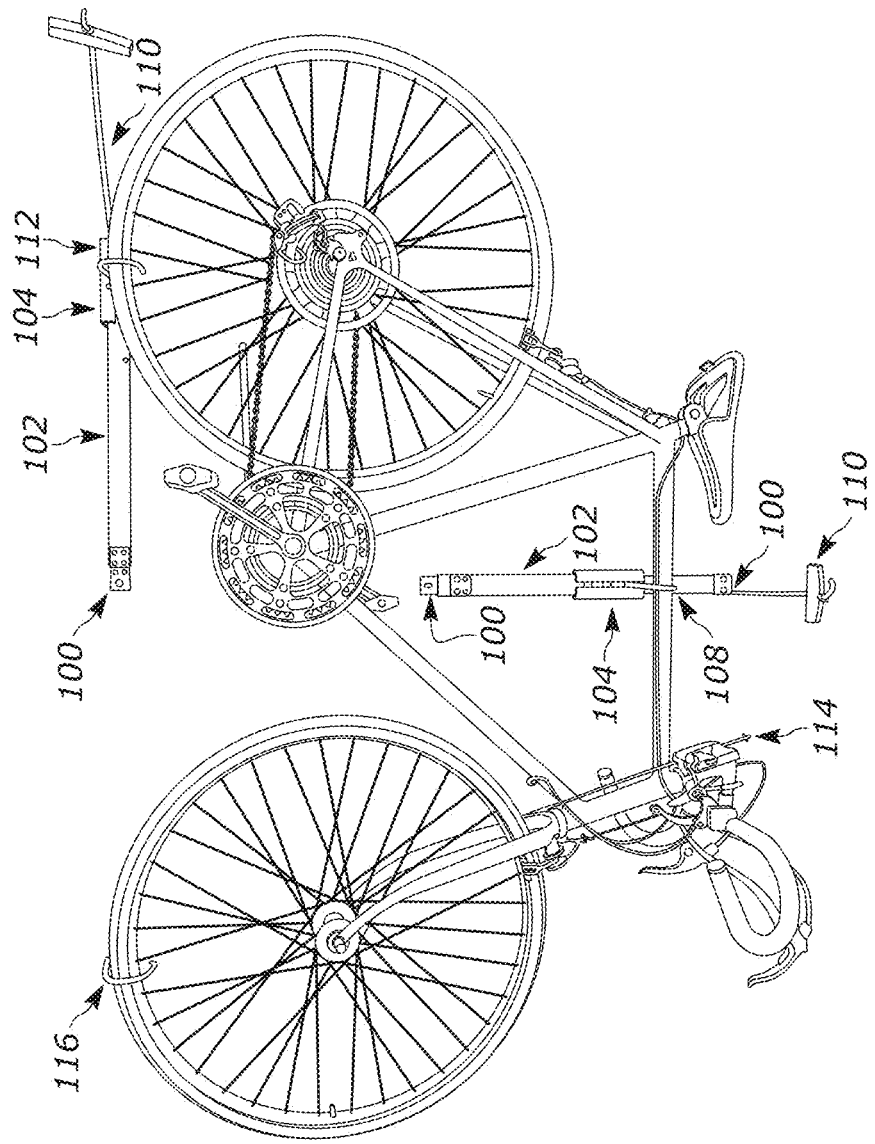
FIG. 1 is a view illustrating embodiments of the bicycle hanger holding a bicycle to the ceiling of a garage according to some embodiments.

Referring to FIG. 1, an exemplary illustration of a bicycle hanger holding a bicycle is illustrated. The bicycle shown is secured flush to the ceiling of a storage environment, such as a garage, shed or the like. Embodiments herein provide a method and system for securing the bicycle flush to a ceiling. More particularly, as shown in FIG. 1, the bicycle hanger system includes at least two tracks 102 coupled to a ceiling via a plurality of brackets 100, which may be T brackets or the like. Each track 102 includes a slide 104 to enable sliding motion of at least two hooks 108, 112.

In one or more embodiments, the bicycle shown may be as a 16 inch framed child's bicycle or as large as a 29 inch framed adult bicycle. As further described below, the tracks 102 and hooks 108, 112 together slide into place to accommodate different sized bicycles.

As shown in FIG. 1, hooks 108 and 112 are coupled to a slide 104 and an elongated pull, such as a rope and handle 110. Thus, hook 108 may be coupled to the bicycle frame and 112 can be coupled to a bicycle wheel to hold the bicycle to a ceiling. Also shown in FIG. 1 is hook 116 which is shown independent of a track to secure a wheel of the bicycle.

Further, as shown in FIG. 1, tracks 104 are placed perpendicularly to accommodate different sized bicycles. More particularly, in one embodiment, the placement of the tracks 102 may be placed following a measurement of a bicycle to enable positioning by sliding of a sliding mechanism 104 of a wheel followed by a second wheel, and then followed by a frame component of the bicycle.

Thus, as shown in FIG. 1, a system for a bicycle hanger may include a track 102 configured to be coupled to a ceiling, the track 102 including a sliding mechanism 104, the sliding mechanism 104 including a hook 108 and the elongated pull 110 coupled to hook 108, and a second track 102 configured to be coupled to the ceiling, the second track 102 positioned perpendicular to another track 102, the second track 102 including a second sliding mechanism 104, the second sliding mechanism 104 including a second hook 112 and a second elongated pull 110 coupled to the second hook 112.

Also shown in FIG. 1 is a bar clamp 114 configured to secure a bicycle tire to a frame component to secure the bicycle prior to hanging the bicycle.

As shown, tracks 102 are configured with a "T" track to enable sliding mechanisms 104 to engage the respective tracks 104. Further, tracks 102 may be held in place by pairs of "z" brackets 100. Thus, the pairs of "z" brackets 100 may couple tracks 102 to a ceiling. The elongated pulls 110 may include rope, a chains, elastic bands, wires or springs.

Each hook 108, 112, and 116 may be curved metal, with hooks 108 and 112 coupled to the sliding mechanisms 104 via a clevis to enable back and forth movement of hooks 108, 112. As shown, each hook 108, 112 is coupled to the elongated pull 110 to enable attachment of the hooks 108/112 to a bicycle portion and positioning the bicycle via pulling the elongated pulls 110 to slide the hooks 108/112 to accommodate different sized bicycles. In embodiments, hooks 108, 112 and 116 may be configured with an elastomeric, rubber or vinyl coating to prevent scratching of bicycle components.

Further, hooks 108, 112, and 116 may have different sizing to enable coupling of the bicycle using different component parts of a bicycle for securing the bicycle to the ceiling. For example, frame hooks may have larger hooks than wheel hooks if a frame is of a larger circumference.

Figure 2:
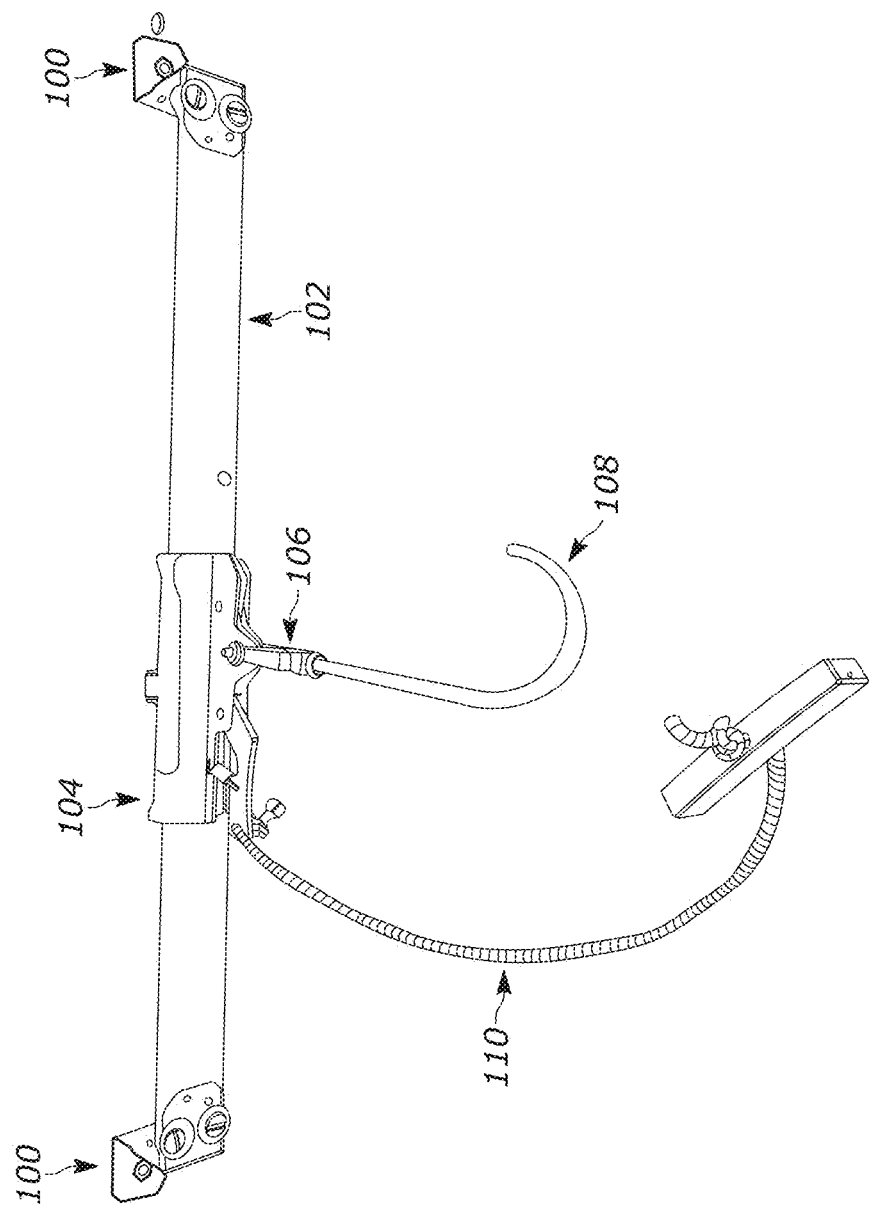
FIG. 2 is a view illustrating an exemplary track according to some embodiments.

Referring now to FIG. 2, a track 102 illustrated as a T-bar or T-track is shown with more particularity. As shown track 102 is shown with sliding mechanism 104, a clevis or rod end 106 coupled to slide mechanism 104 to enable hook 108 to be securely attached thereto. At an opposing end of sliding mechanism 104, elongated pull 110 is shown implemented as a rope and pull/handle. Depending on how high a ceiling may be or the height of a user, the rope or other elongated pull may be longer or shorter.

Also shown in FIG. 2 are more detailed Z-brackets 100 to enable attachment of track 102 to a ceiling. As shown, the brackets are disposed at either end of track 102 to secure the track 102 to a ceiling.

Figure 3:
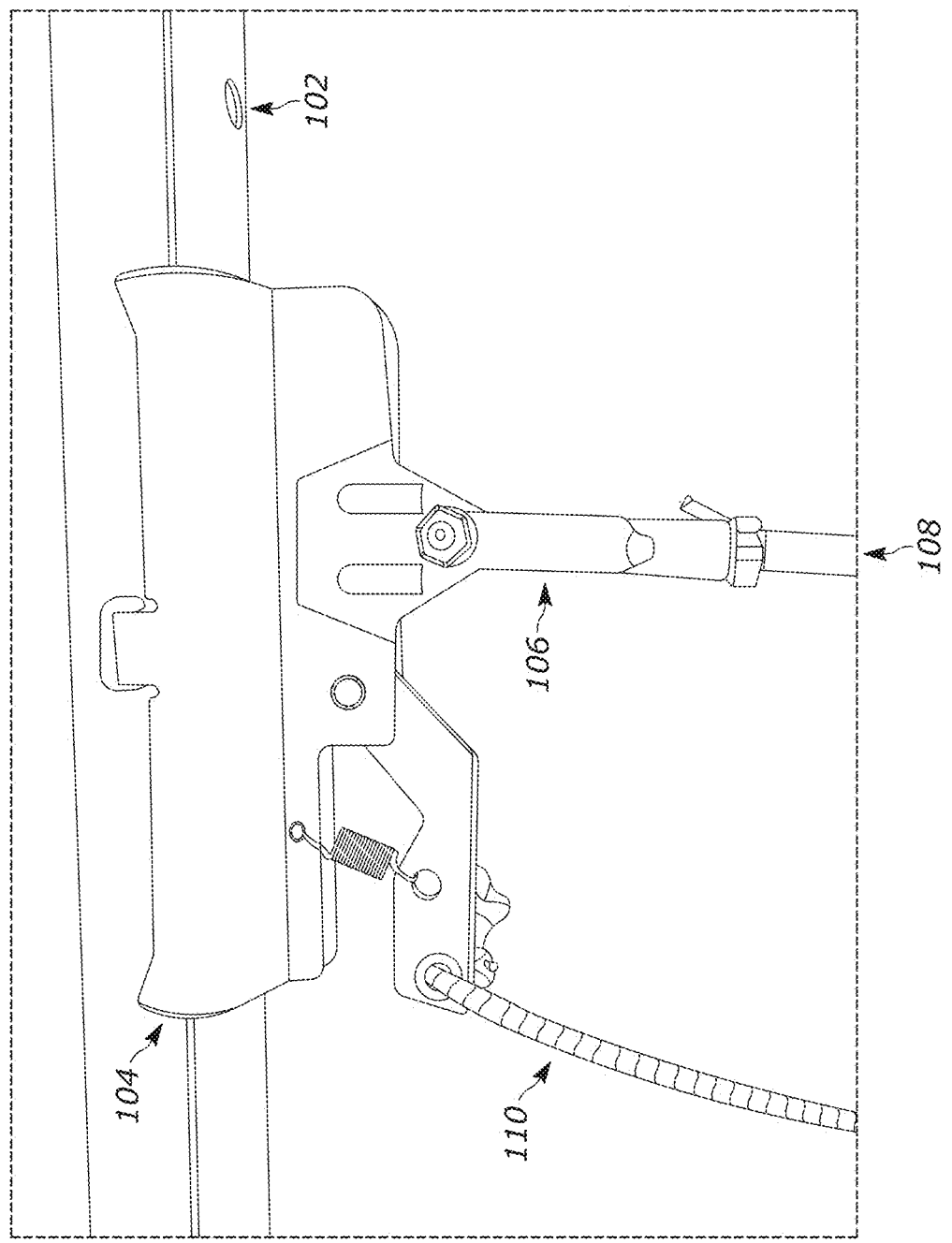
FIG. 3 is a view of a sliding mechanism on a track according to some embodiments.

Referring now to FIG. 3, sliding mechanism 104 is shown in more detail. As shown, sliding mechanism 104 slides on track 102. Sliding mechanism 104 includes an elongated pull 110 coupled to a first end of the sliding mechanism and a clevis 106 that enables attachment of hook 108.

Figure 4:
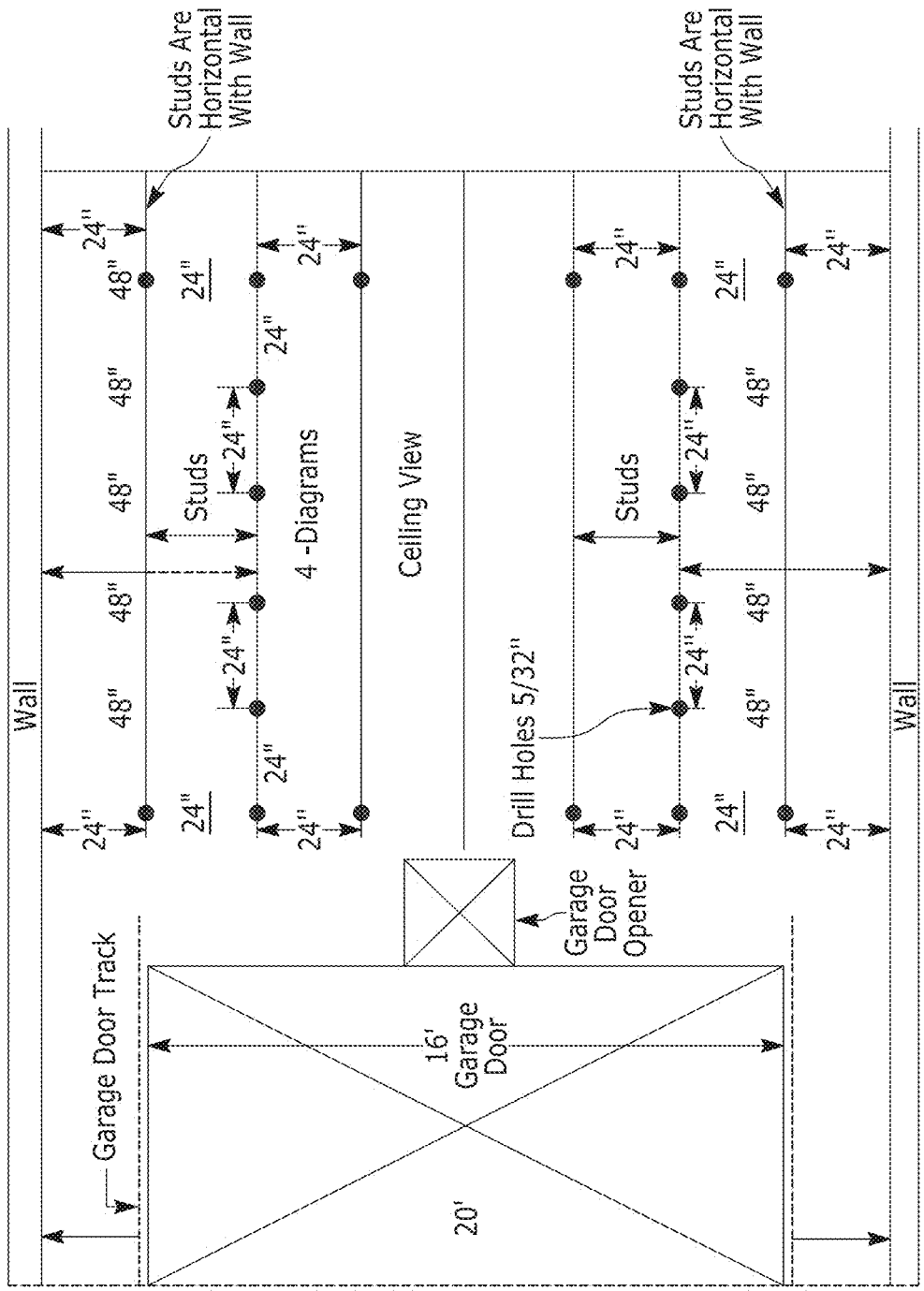
FIG. 4 is a view of an exemplary ceiling configuration of a garage according to some embodiments.
Figure 5:
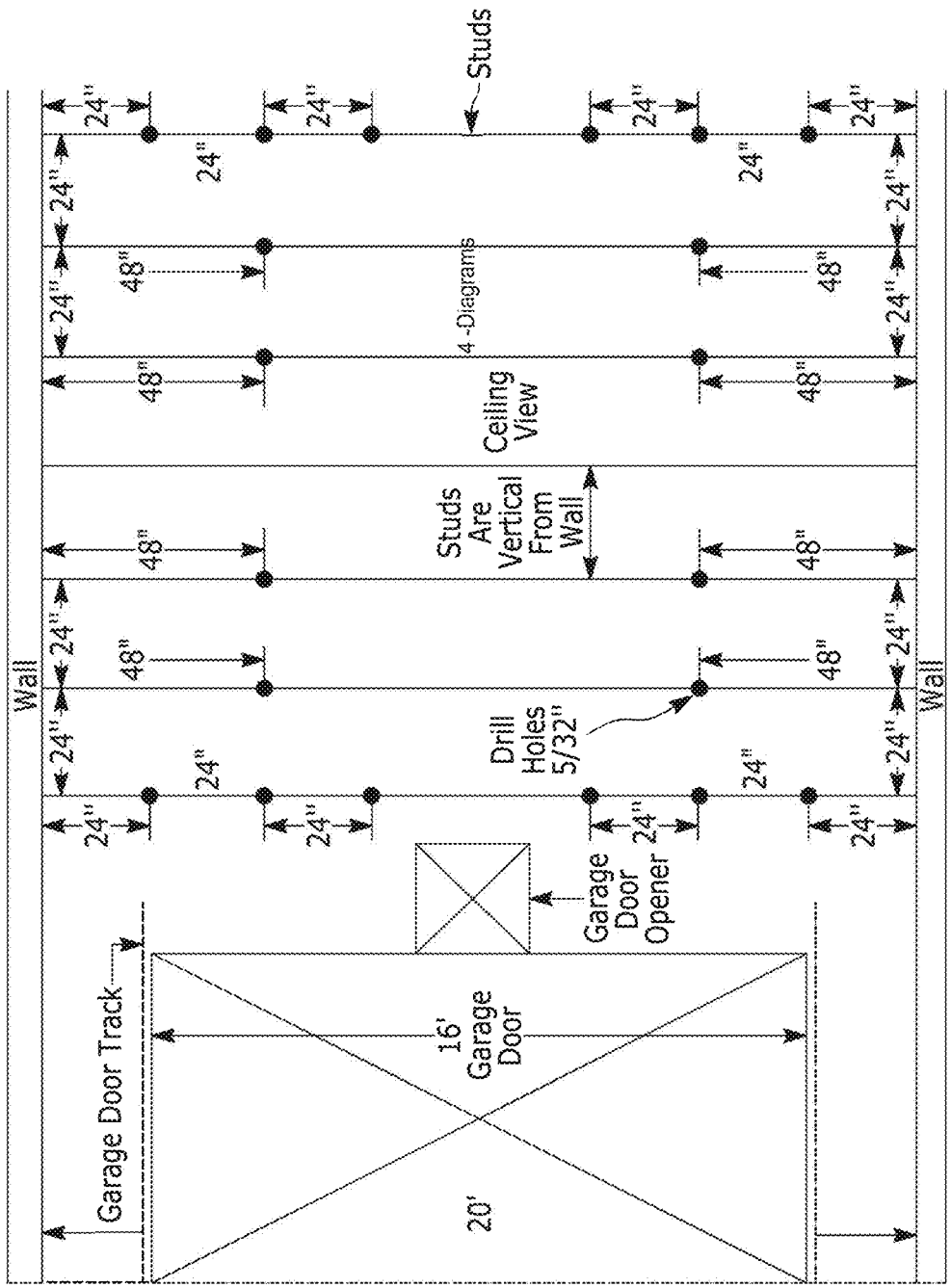
FIG. 5 is another view of an exemplary ceiling configuration of a garage according to some embodiments.

Referring to FIGS. 4 and 5, different ceiling configurations are illustrated showing different garages that might be appropriate for securing a bicycle in accordance with embodiments herein. More specifically, FIG. 4 illustrates a garage with longitudinally oriented studs in a ceiling such that they are in line with side walls. FIG. 5 illustrates a garage with horizontally oriented studs in a ceiling. To install the bicycle hanger it is first necessary to find the direction of the ceiling studs using a stud finder or the like. Preferably, measuring 24 inches from a wall to the center of a stud enables drilling of a 5/32" hole for a first track 102 and measuring 24" from the drilled hole enables drilling a second 5/32" hole, and so on to drill 3 holes 24" apart. The center hole then can be used to identify a perpendicular location of a second track 102. Thus, measuring 24" from the center hole another hole can be drilled and another 24" thereafter another 5/32" hole can be drilled for the second track 102. Thus, you will have three holes in one direction and two holes perpendicularly located from the center hole of the three holes.

Next, once you have three holes drilled into the studs, determine which two holes are for a first track 102 and which end hole is for an extended hook. The perpendicular two holes are for the second track 102.

In one embodiment, a smaller hook may be installed with a first track 102 and a larger hook installed with a second track 102.

As described above, clamp 114 is placed on a front wheel and rim area and extended to a frame component of a bicycle before hanging a bicycle on the hanger.

Another embodiment is directed to a method for a bicycle hanger system. The method includes first determining a stud pattern for a ceiling. Next, the method includes installing a first track 102 along a stud in the ceiling according to the stud pattern, track 102 configured to be coupled to the ceiling. The track 102 including a sliding mechanism 104, the sliding mechanism 104 including a hook 108/112 and an elongated pull 110 coupled to the hook 108/112.

Next the method includes installing a second track 102 perpendicular to the first track 102 according to the stud pattern. The second track 102 also includes a sliding mechanism 104, including a second hook 108/112 and a second elongated pull 110 coupled to a second hook 108/112.

Next, the method includes clamping using clamp 114 one or more tires of the bicycle to a bicycle frame component to secure the bicycle prior to hanging the bicycle. One clamp appropriate for securing a wheel may be a commercially available bar clamp, such as a Quick-Grip® by Vise-Grip® that may be adjustable for different sized bicycles.

Next the method includes installing pairs of "z" brackets 100 to couple each track 102 to the ceiling, one pair of "z" brackets 100 per track 102.

The method next includes attaching a bicycle wheel to each of hooks 116/112 and providing a hook 108 attached to a frame of the bicycle.

Next, the method includes pulling an elongated pull 110 to secure the bicycle wheel close the ceiling. And then, pulling a second elongated handle 110 to enable different sized bicycles to slide on sliding mechanism 104 to accommodate the bicycle frame against the ceiling.

What is claimed is:

1. A system for a bicycle hanger comprising:
   a track to be coupled to a ceiling, the track including a sliding mechanism, the sliding mechanism comprising a hook and an elongated pull coupled to the hook;
   a second track to be coupled to the ceiling, the second track positioned perpendicular to the first track, the second track including a second sliding mechanism, the second sliding mechanism comprising a second hook and a second elongated pull coupled to the second hook;

a first pair of "z" brackets and a second pair of "z" brackets, the first pair of "z" brackets to couple the track to the ceiling, the second pair of "z" brackets to couple the second track to the ceiling; and a third hook coupled to the ceiling, the third hook to secure a forward wheel of a bicycle, wherein the first hook and the second hook are to secure a rearward wheel and a bicycle frame via the elongated pull and the second elongated pull, by positioning the first hook and the second hook according to the size of the bicycle.

2. The system for a bicycle hanger of claim 1, wherein:

the track and the second track intersect to form a T-shaped configuration to enable the sliding mechanism and second sliding mechanism to engage the track and the second track.

3. The system for a bicycle hanger of claim 1, wherein:

the elongated pull and the second elongated pull comprise one or more of a rope, a chain, an elastic band, a wire or spring.

4. The system for a bicycle hanger of claim 1 wherein:

each of the hook and the second hook comprise a curved metal component coupled to the sliding mechanism and the second sliding mechanism, respectively, via a clevis to enable back and forth movement of the sliding mechanism using the hook and the second hook.

5. The system for a bicycle hanger of claim 1 wherein:

the first hook and the second hook are each coupled to a respective elongated pull to enable attachment to the bicycle and respective sliding mechanism.

6. The system for a bicycle hanger of claim 1 wherein:

each hook includes an elastomeric, rubber or vinyl coating to prevent scratching of the bicycle.

7. The system for a bicycle hanger of claim 1 wherein:

the hook and the second hook are with different sizing to enable attachment of the bicycle using alternative component parts of the bicycle for securing the bicycle to the ceiling.

8. The system for a bicycle hanger of claim 1 wherein the bicycle hanger accommodates bicycles having a frame size of between 16 inches and 29 inches.

9. A method for a bicycle hanger comprising:

determining a stud pattern for a ceiling;

installing a first track along a stud in the ceiling according to a stud pattern, the first track to be coupled to the ceiling, the first track including a sliding mechanism, the sliding mechanism including a hook and an elongated pull coupled to the hook;

installing a second track perpendicular to the first track according to the stud pattern, the second track to be coupled to the ceiling, the second track including a second sliding mechanism, the second sliding mechanism including a second hook and a second elongated pull coupled to a second hook;

installing a first pair of "z" brackets and a second pair of "z" brackets, the first pair of "z" brackets to secure the track to the ceiling, the second pair of "z" brackets to secure the second track to the ceiling; and clamping one or more wheels of the bicycle to a bicycle frame component to secure the bicycle.

10. The method of claim 9 for the bicycle hanger further comprising:

attaching the bicycle to the hook and the second hook, wherein each hook is attached to a wheel of the bicycle;

attaching a third hook to a frame component of the bicycle; and pulling a first elongated handle and the second elongated handle to slide at least the bicycle wheel and the bicycle frame to accommodate a plurality of bicycle sizes wherein the bicycle is secured flush with the ceiling.

11. The method of claim 9 for the bicycle hanger wherein the bicycle hanger accommodates bicycles having a frame size of between 16 inches and 29 inches.

* * * * *